United States Patent
Hammes et al.

(10) Patent No.: US 6,785,348 B2
(45) Date of Patent: Aug. 31, 2004

(54) DEMODULATOR AND METHOD FOR DEMODULATING CPFSK-MODULATED SIGNALS USING A LINEAR APPROXIMATION OF THE CPFSK SIGNAL

(75) Inventors: Markus Hammes, Dinslaken (DE); Michael Madden, Mountain View, CA (US); Andre Neubauer, Krefeld (DE); Michael Speth, Düsseldorf (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/328,917

(22) Filed: Dec. 23, 2002

(65) Prior Publication Data

US 2003/0128778 A1 Jul. 10, 2003

Related U.S. Application Data

(63) Continuation of application No. PCT/DE01/02200, filed on Jun. 11, 2001.

(30) Foreign Application Priority Data

Jun. 21, 2000 (DE) ......................................... 100 30 390

(51) Int. Cl.[7] ............................................... H03D 3/10
(52) U.S. Cl. .................................... 375/334; 375/341
(58) Field of Search ................................. 375/334, 341, 375/262, 279, 222, 224, 346; 714/794

(56) References Cited

U.S. PATENT DOCUMENTS

| | | | | |
|---|---|---|---|---|
| 4,603,393 A | | 7/1986 | Laurent et al. | 329/306 |
| 6,298,102 B1 | * | 10/2001 | Rainish et al. | 375/341 |
| 6,445,745 B1 | * | 9/2002 | Bontu et al. | 375/279 |

FOREIGN PATENT DOCUMENTS

| | | |
|---|---|---|
| DE | 197 13 175 C2 | 10/1998 |
| FR | 2 543 382 A1 | 3/1983 |
| WO | WO 99/56399 | 11/1999 |

OTHER PUBLICATIONS

Colavolpe, G. et al.: "Noncoherent Sequence Detection of CPM", Electronics Letters, vol. 34, No. 3, 1998.
Laurent, P.: "Exact and Approximate Construction of Digital Phase Modulations by Superposition of Amplitude Modulated Phases (AMP)", IEEE, 1986, pp. 150–160.
Kammeyer, K. D.: "Nachrichtenübertragung" [Message Transmission], B. G. Teubner Stuttgart, 1996, pp. 410–489, 739–745.

* cited by examiner

*Primary Examiner*—Khai Tran
(74) *Attorney, Agent, or Firm*—Laurence A. Greenberg; Werner H. Stemer; Ralph E. Locher

(57) ABSTRACT

In a method for demodulating a CPFSK-modulated signal, the n−1-th substitute symbol $a_{n-1}$ which occurs in the linear approximation of the CPFSK is estimated in order to determine an n-th input data symbol $d_n$ on which the CPFSK modulation is based. The n−1-th substitute symbol $a_{n-1}$ is in this case estimated on the basis of the previously determined n−1-th input data symbol $\hat{d}_{n-1}$.

10 Claims, 3 Drawing Sheets

DEMODULATOR AND METHOD FOR DEMODULATING CPFSK-MODULATED SIGNALS USING A LINEAR APPROXIMATION OF THE CPFSK SIGNAL

CROSS-REFERENCE TO RELATED APPLICATION

This application is a continuation of copending International Application No. PCT/DE01/02200, filed Jun. 11, 2001, which designated the United States and was not published in English.

BACKGROUND OF THE INVENTION

FIELD OF THE INVENTION

The invention relates to a method and a device for coherently demodulating a frequency-modulated signal with a continuous phase.

A large number of digital modulation types are known, which are based on Amplitude Shift Keying (ASK), Frequency Shift Keying (FSK) or Phase Shift Keying (PSK) methods as well as mixed forms of them. For frequency economy reasons, so-called CPM (Continuous Phase Modulation) modulation types with a continuous phase are frequently used in digital communications systems. FSK with a continuous phase is referred to as CPFSK (Continuous Phase FSK). One example of this is Gaussian Minimum Shift Keying (GMSK), which is used in the pan-European GSM (Global System for Mobile Communictions) mobile radio standard.

Coherent or incoherent methods may be used for demodulating the CPFSK signal. Incoherent demodulation may be carried out either by using an analog FM demodulator or digitally by using a differential demodulator. One disadvantage is that relatively high losses in the region of 3 dB occur with incoherent demodulation. Furthermore, drops in power occur, since the Inter Symbol Interference (ISI) cannot be taken into account.

CPFSK modulation, which is primarily non-linear, can be described approximately as linear modulation. The linear approximation on which this characteristic is based is described in the article "Exact and Approximate Construction of Digital Phase Modulations by Superposition of Amplitude Modulated Pulses (AMP)" by Pierre A. Laurent, IEEE Trans. Commun., Volume COM-34 (1986), pages 150–160. This characteristic of CPFSK-modulated signals provides the capability for coherent demodulation.

The book "Nachrichtenübertragung" [Information transmission] by K. D. Kammeyer, B. G. Teubner Verlag, Stuttgart 1996, Section 12.1.5, pages 422 and 423, which represents the closest prior art, describes a coherent demodulator for CPFSK signals with a modulation index η, which is equal to 0.5 or to a multiple of 0.5. The in-phase and quadrature branches of the received signal are sampled alternately (because of the 90° phase offset between these branches), and the sample values obtained are compared with the corresponding complex-value representations of the CPFSK substitute symbols (on which the linear approximation is based) for the input data symbols used at the transmitter. Among the possible input data symbols, the input data symbol that is actually transmitted is defined as the one whose complex-value substitute symbol comes closest to the two measured sample values (real and imaginary part).

This coherent demodulation method for CPFSK signals can be generalized to rational modulation indices η=M/N (where M and N are integers). With rational modulation indices, there are always a finite number of substitute symbol states, so that the demodulation can still be carried out just by comparing the sample values with the finite modulation alphabet of substitute symbols.

There is no longer any finite modulation alphabet of substitute symbols for non-rational modulation indices η. The result of this is that the conventional method for coherent CPFSK demodulation can no longer be used in these situations.

SUMMARY OF THE INVENTION

It is accordingly an object of the invention to provide a method and a device for demodulating a CPFSK-modulated received signal, which overcome the above-mentioned disadvantages of the prior art methods and apparatus of this general type.

In particular, it is an object of the invention to provide a method and a device for demodulating CPFSK received signals, which enables good reception and enables the CPFSK received signal to be demodulated even when the modulation indices are not rational.

With the foregoing and other objects in view there is provided, in accordance with the invention, a method for demodulating a CPFSK-modulated signal. The method includes steps of: obtaining an estimate of an n−1-th substitute symbol, which occurs in a linear approximation of the CPFSK modulated signal, as a function of a previously determined n−1-th input data symbol; and determining an n-th input data symbol on which the CPFSK modulated signal is based by using the estimate of the n−1-th substitute symbol occurring in the linear approximation of the CPFSK modulated signal.

In accordance with an added feature of the invention, the step of obtaining the estimate of the n−1-th substitute symbol includes using an equation $\hat{a}_{n-1}=\hat{a}_{n-2}\exp\{j\pi\eta \hat{d}_{n-1}\}$, where $\hat{a}_{n-1}$ is the estimate for the n−1-th substitute symbol, $\hat{a}_{n-2}$ is an estimate for an n−2-th substitute symbol, $\hat{d}_{n-1}$ is the n−1-th input data symbol that has been determined, and η denotes a modulation index.

In accordance with an additional feature of the invention, the step of determining the n-th input data symbol includes determining the n-th input data symbol $d_n$ based on a phase angle of a currently obtained n-th complex-value sample symbol $y_n$ relative to a phase angle of the estimate of n−1-th substitute symbol $\hat{a}_{n-1}$ that has been estimated for an n−1-th time step.

In accordance with another feature of the invention, the step of determining the n-th input data symbol $d_n$ includes obtaining a determined value of the n-th input data symbol $d_n$ using an equation:

$$\hat{d}_n = \begin{cases} 1 & \arg(y_n) > \arg(\hat{a}_{n-1}) \\ -1 & \arg(y_n) < \arg(\hat{a}_{n-1}) \end{cases};$$

where $\hat{d}_n$ is the determined value of the n-th input data symbol $d_n$.

In accordance with a further feature of the invention, the method includes using an equalizer, and in an even more preferred embodiment, the method includes using a Viterbi equalizer for performing the step of determining the n-th input data symbol $d_n$.

In accordance with a further added feature of the invention, the step of obtaining the equalization includes basing the equalization on a trellis state diagram, in which an i-th channel state relating to a time step n is described by an L-tuple $Z_n^i = (z_n^{L-1,(i)}, \ldots, z_n^{1,(i)}, z_n^{0,(i)})$. In the equation, $z_n^{L-1,(i)}, \ldots, z_n^{1,(i)}, z_n^{0,(i)}$ can each assume possible values of input data symbols $d_n$, and L denotes a channel memory.

With the foregoing and other objects in view there is also provided, in accordance with the invention, a device for demodulating a CPFSK-modulated signal. The device includes: an input data symbol decision device for determining an n-th input data symbol on which the CPFSK-modulated signal is based; and a substitute symbol estimation device for estimating an n−1-th substitute symbol occurring in a linear approximation of the CPFSK-modulated signal as a function of a previously determined n−1-th input data symbol. The input data symbol decision device uses the n−1-th substitute symbol that has been estimated for determining the n-th input data symbol.

In accordance with an added feature of the invention, the substitute symbol estimation device is constructed for estimating the n−1-th substitute symbol using the equation $\hat{a}_{n-1} = \hat{a}_{n-2} \exp\{j\pi\eta \hat{d}_{n-1}\}$, where $\hat{a}_{n-1}$ is an estimate of the n−1-th substitute symbol, $\hat{a}_{n-2}$ is an estimate of an n−2-th substitute symbol; $\hat{d}_{n-1}$ is the n−1-th input data symbol that has been determined; and η denotes a modulation index.

In accordance with an additional feature of the invention, the input data symbol decision device is constructed for determining the n-th input data symbol $d_n$ based on a phase angle of a currently obtained n-th complex-value sample symbol $y_n$ relative to a phase angle of the n−1-th substitute symbol $\hat{a}_{n-1}$ that has been estimated for an n−1-th time step.

In accordance with another feature of the invention, the input data symbol estimation device is an equalizer, and in an even more preferred embodiment, is a Viterbi equalizer.

According to the invention, the demodulation (that is to say the determination of the n-th input data symbol on which the CPFSK modulation is based) is based on estimating the n−1-th substitute symbol that occurs in the linear approximation of the CPFSK. The demodulation is thus always carried out on the basis of substitute symbols that are estimated in the receiver. This means that there is no need for a fixed modulation alphabet that is already known in the receiver, and instead of this, the receiver "follows" the state of the transmitter by estimation.

In the case of demodulation without channel equalization, the n-th input data symbol $d_n$ can easily be determined on the basis of the phase angle of a currently obtained n-th complex-value sample symbol $y_n$ relative to the phase angle of the substitute symbol $\hat{a}_{n-1}$ which is estimated for the n−1-th time step.

Alternatively, an equalizer, in particular a Viterbi equalizer, can be used to determine the n-th input data symbol $d_n$. In this case, one advantageous measure is characterized by basing the equalization on a trellis state diagram, in which the i-th channel state relating to the time step n is described by an L-tuple:

$Z_n^i = (z_n^{L-1,(i)}, \ldots, z_n^{1,(i)}, z_n^{0,(i)})$, in which case the variables $z_n^{L-1,(i)}, \ldots, z_n^{1,(i)}, z_n^{0,(i)}$ can each assume the possible values of the input data symbols $d_n$ (L denotes the channel memory).

Other features which are considered as characteristic for the invention are set forth in the appended claims.

Although the invention is illustrated and described herein as embodied in a method and a device for demodulating CPFSK-modulated signals using a linear approximation of the CPFSK signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
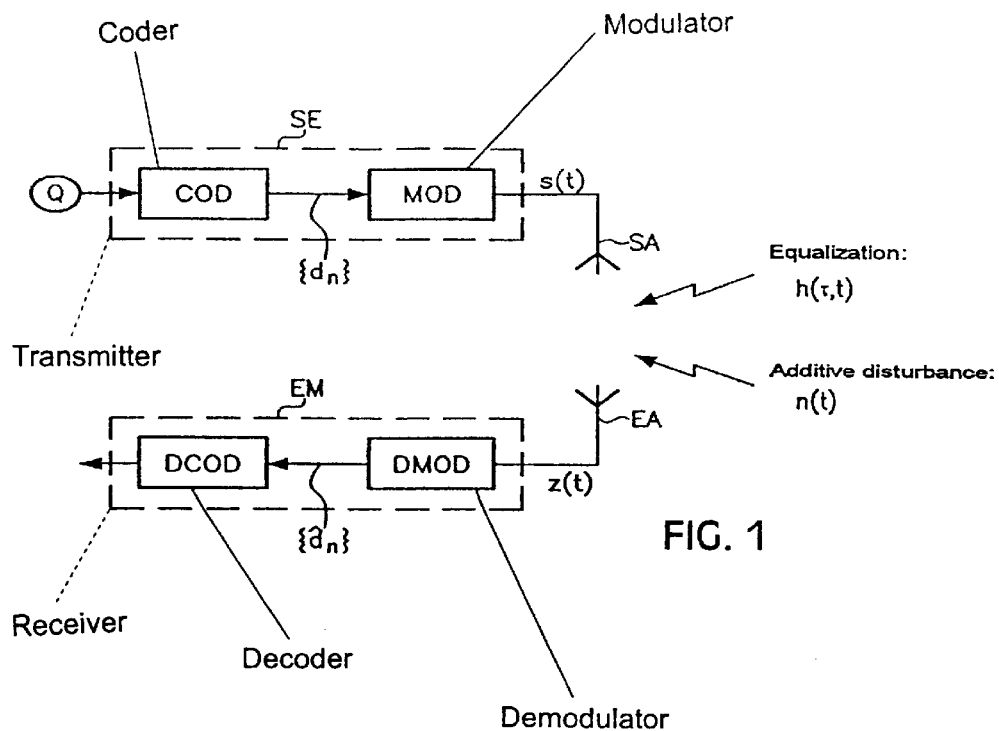
FIG. 1 is a block diagram showing the basic structure of a digital transmission system.

Referring now to the figures of the drawing in detail and first, particularly, to FIG. 1 thereof, there is shown the known basic design of a digital transmission system, as used in mobile radio systems, for example.

A transmitting device or transmitter SE receives an analog source signal Q (produced, for example, by a microphone) and passes this to a coder COD. The coder COD has (in a manner which is not illustrated) an analog/digital converter for digitizing the source signal Q, and furthermore, may contain a source coder, a channel coder, an interleaver and a block forming device, which compress the digitized source signal Q in some suitable manner, provide it with error protection coding, interleave it, and subdivide it into data blocks.

The coder COD emits a digital data signal that includes a symbol sequence $\{d_n\}$ of the data symbols $d_0, d_1, \ldots$ on which, for example, the range of values $\{-1, 1\}$ is based. The symbol sequence $\{d_n\}$ is passed to a modulator MOD that modulates a radio-frequency carrier as a function of the symbol sequence $\{d_n\}$. The modulated, time-dependent real transmission signal s(t) produced in this way is fed to a transmission channel, that is to say, for example, it is emitted as a radio signal via a transmission antenna SA.

The data symbols $d_0, d_1, \ldots$ are referred to in the following text as input data symbols (for the modulator).

Signal distortion and signal disturbances can occur during the transmission of the transmission signal s(t) via the transmission channel, both of which are dependent on the nature of the transmission channel.

The distorting influence of the transmission channel is described by a channel impulse response h(τ,t). The additive disturbance component, which is superimposed on the distorted signal, is described by a function n(t). A time-continuous received signal z(t), which is received at a receiver EM is accordingly given by:

$$z(t) = \int_0^\infty h(\tau, t) \cdot s(t - \tau) d\tau + n(t) \tag{1}$$

The receiver EM receives the real received signal z(t) (possibly distorted and subject to disturbances) which is present at the output of the transmission channel, for example using a receiving antenna EA. The received signal z(t) is passed to a demodulator DMOD and then to a decoder DCOD. The demodulator DMOD demodulates the received signal z(t). A symbol sequence $\{\hat{d}_n\}$ is produced at the output of the demodulator DMOD, whose elements $\hat{d}_n$ are estimated values of the associated input data symbols $d_n$.

Figure 2:
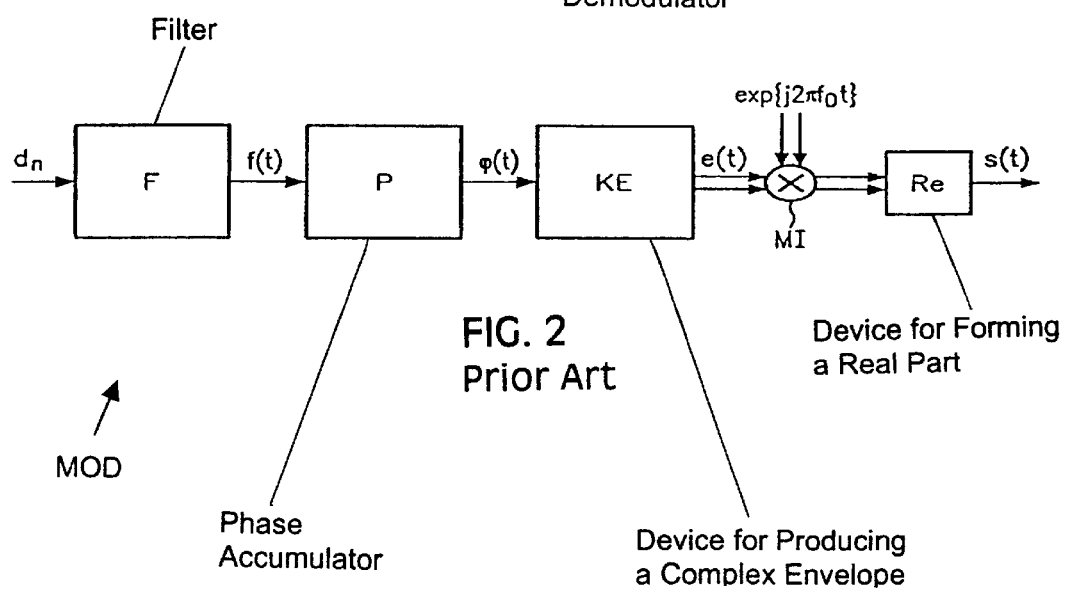
FIG. 2 is a block diagram of a prior art binary CPFSK modulator.

In order to explain CPFSK modulation, FIG. 2 is provided which is a block diagram showing the structure of a conventional CPFSK modulator device MOD. In FIG. 2, a single arrow is used to identify real-value variables, and a double arrow is used to identify complex-value variables.

In the signal path, the CPFSK modulator MOD has a filter F, a phase accumulator P, a device KE for producing a complex envelope e(t), a mixing stage MI and a device Re for forming the real part of an incoming signal. The (real) modulated signal s(t) is produced at the output of the device Re for forming the real part.

The filter F is assumed to have the real impulse response g(t). The impulse response g(t) is referred to in the following text as the baseband impulse. The pulse shape and the (time) duration of the baseband impulse g(t) define the CPFSK modulation type.

As is known, various pulse shapes, for example square-wave pulses, $\cos^2$ pulses or else Gaussian pulses, may be used.

The pulse duration TK of the baseband impulse g(t) (that is to say the time period during which the baseband impulse g(t) has a value other than zero) may extend over K=1, 2, 3, . . . symbol time periods T. The expression Full Response Modulation types is used for K=1. If the baseband impulse g(t) extends over a number of symbol time periods (that is to say K=2, 3, . . . ), so-called partial response modulation types are generated.

The real pulse amplitude-modulated frequency signal f(t) which is produced at the output of the filter F is, when t>0, a linear superimposition of time-shifted versions of g(t) weighted by the symbols $d_n$ in the input data symbol sequence $\{d_n\}$:

$$f(t) = \sum_n d_n g(t - nT) \qquad (2)$$

The pulse amplitude-modulated frequency signal f(t) is integrated in the phase accumulator P in order to form the phase signal $\phi(t)$. This is calculated from the phase signal $\phi(t)$ in the device KE in order to produce the complex envelope e(t), using the equation:

$$e(t) = \exp\{j(\phi(t)+\phi_0)\} \qquad (3)$$

In this case, j denotes the imaginary unit and $\phi_0$ an integration constant. In consequence, the complex envelope e(t) becomes:

$$e(t) = \exp\left\{j\left(2\pi\Delta F \int_{-\infty}^{t} f(\tau)d\tau\right)\right\} \qquad (4)$$

In this case, $\Delta F$ denotes the frequency shift used for the modulation. The modulation index $\eta$ is normally defined by $\eta=2\Delta FT$.

The complex envelope e(t) is then multiplied by the radio frequency carrier, and the frequency $f_0$, in the mixing stage MI. The real part (Re) of the up-mixed signal is the modulated transmission signal s(t).

The primary non-linear CPFSK modulation can be represented, according to the abovementioned article by P. A. Laurent, approximately as linear modulation using substitute symbols $a_n$ instead of the input data symbols $d_n$ in the form:

$$e(t) \approx \sum_n a_n \cdot C_0(t - nT) \qquad (5)$$

There is a known functional relationship between the so-called elementary impulse $C_0(t)$ and the baseband impulse g(t), and this allows the associated elementary impulse $C_0(t)$ to be determined for a predetermined CPFSK modulation type (that is to say for a predetermined baseband impulse g(t)). In this context, reference is made to the already mentioned article by P. A. Laurent.

The relationship between the substitute symbols $a_n$ and the input data symbols $d_n$ is as follows:

$$a_n = \exp\left\{j\pi\eta \sum_{i=-\infty}^{n} d_i\right\} \qquad (6)$$

Each substitute symbol is in consequence obtained from the accumulated input data symbols.

Equation (6) shows that a finite number of substitute symbols exist only when the modulation index $\eta$ is rational. The following relationship is also obtained from equation (6):

$$a_n = a_{n-1} \exp\{j\pi\eta d_n\} \qquad (7)$$

Figures 4A, 4B:
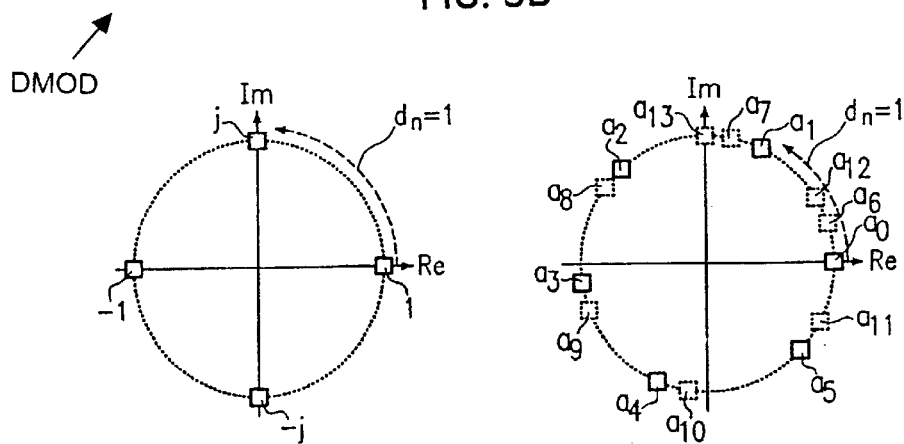
FIG. 4A is a vector or signal space representation of the possible substitute symbols for CPFSK with a modulation index of η=0.5.
FIG. 4B is a vector or signal space representation of the possible substitute symbols for CPFSK with an irrational modulation index η.

FIG. 4A shows a vector or signal space representation of the possible substitute symbols $a_n$ for CPFSK with a modulation index of $\eta=0.5$. The real part is plotted on the x axis, and the imaginary part is plotted on the y axis. It can clearly be seen that four states exist for $\eta=0.5$, that is to say the substitute symbols $a_n$ (for an initial phase 0) for $d_n=1$ or $-1$, can assume only the four values 1, j, $-1$, $-j$. These four values of an are referred to as the modulation alphabet.

By way of example, let us assume that $a_{n-1}=1$. The state transition to $a_n=j$, which is represented by the dashed-line arrow, is produced by an input data symbol $d_n=1$.

Figure 3A:
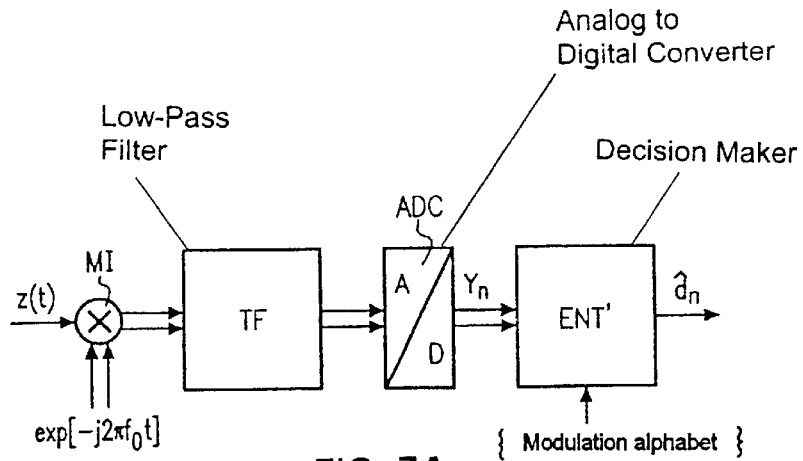
FIG. 3A is a block diagram of a prior art coherent CPFSK demodulator.

The known demodulation of a CPFSK signal will be explained in the following text for a transmission channel without any memory and without additive noise. The purpose of the demodulator is to determine the input data symbol sequence $\{d_n\}$ from the received signal z(t). FIG. 3A shows a prior art demodulator DMOD', which is suitable for this purpose. Complex-value variables are once again represented by a double arrow.

The demodulator DMOD' may have a mixing stage MI, which is operated at the frequency $f_0$, and which is used for down-mixing the received signal z(t) to baseband. However, it is also possible to process the received signal z(t) in the pass band, using a suitably chosen intermediate frequency.

A low-pass filter TF is used for bandwidth limiting. The filtering process is followed by sampling the down-mixed and the filtered received signal z(t) using an analog-digital converter ADC. The sampling process is carried out at least at the symbol clock rate 1/T.

A sequence $\{y_n\}$ including complex-value sample values $y_n$ is produced at the output of the ADC.

The sequence $\{y_n\}$ of complex-value sample values is passed to a decision maker ENT'. The decision maker ENT' determines the estimated input data symbol sequence $\{\hat{d}_n\}$ from the complex-value sample values $y_n$ [[$1_n$]] and from the finite modulation alphabet, which is know to the decision maker ENT'.

If the matched filter impulse response associated with the elementary impulse $C_0(t)$ is provided for the low-pass filter TF, then the complex-value sample values $y_n$ are demodulated simply by comparing the sample values $y_n$ with the modulation alphabet. All that is necessary in the case of a 4-element modulation alphabet as explained in FIG. 4A is to determine the mathematical sign of the real part and of the imaginary part of $y_n$. The receiver-end determination of $a_n$ which is obtained in this case and is denoted $\hat{a}_n$, and the determination of $a_{n-1}$ in the previous time step, denoted $\hat{a}_{n-1}$, results directly, from the relationship stated in equation (7), in the estimate for the input data symbol $d_n$, that is to say $\hat{d}_n$.

Figure 3B:
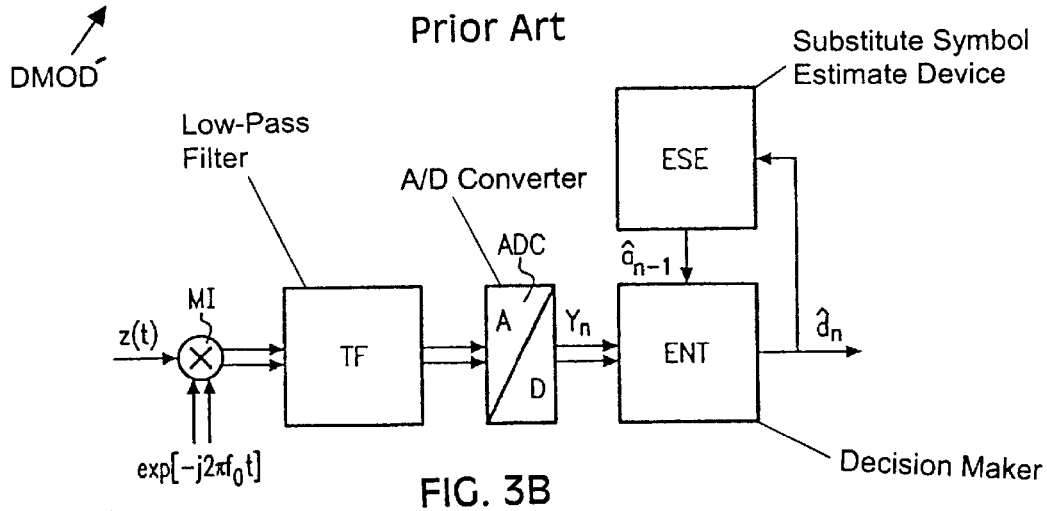
FIG. 3B is a block diagram of an exemplary embodiment of an inventive coherent CPFSK demodulator.

FIG. 3B shows a block diagram of an exemplary embodiment of an inventive demodulator DMOD. Comparable parts are denoted by the same reference symbols as in FIG. 3A.

In this case as well, the demodulator DMOD has a decision maker ENT to which the sequence $\{y_n\}$ of complex-value sample values is passed. Furthermore, a substitute symbol estimate device ESE is provided, which provides the decision maker ENT with an estimate $\hat{a}_{n-1}$ of the n−1-th substitute symbol $a_{n-1}$ in order to determine the n-th input data symbol $d_n$.

The form in which the decision maker ENT is implemented depends on the nature of the transmission channel under consideration. A transmission channel in which the distortion and disturbances are low will be considered first of all, in which demodulation can be carried out without equalization.

The determination of $\hat{d}_n$ in the decision maker ENT is based on the following relationship:

$$\hat{d}_n = \begin{cases} 1 & \arg(y_n) > \arg(\hat{a}_{n-1}) \\ -1 & \arg(y_n) < \arg(\hat{a}_{n-1}) \end{cases} \quad (8)$$

In this case, arg(•) denotes the argument of the complex number indicated in the bracketed expression, expressed in radians. In the inventive process for determining $\hat{d}_n$, the decision is made on the basis of the phase angle of the current sample symbol $y_n$ relative to the phase angle of the substitute symbol $\hat{a}_{n-1}$ estimated for the previous time step.

The decision which is made with respect to $\hat{d}_n$ is used in a next step to estimate the state of the substitute symbol $a_n$. In the simplest case, this is done using the following relationship:

$$\hat{a}_n = \hat{a}_{n-1} \exp\{j\pi\eta\hat{d}_n\} \quad (9)$$

This estimated substitute symbol $\hat{a}_n$ is then used as the basis for deciding on the input data symbol $\hat{d}_{n+1}$ for the next time step in accordance with equation (8).

The inventive method allows coherent demodulation of CPFSK-modulated signals for any given modulation indices. This situation will be explained with reference to FIG. 4B.

FIG. 4B shows a vector or signal space representation of the substitute symbols for CPFSK which is comparable to that shown in FIG. 4A, but based on an irrational modulation index η. Since the modulation index η is irrational, there are an infinitely large number of values (states) for $a_n$, that is to say the modulation alphabet is infinitely large. The first 13 substitute symbols $a_1, a_2, \ldots, a_{13}$ which result from state transitions which are produced by $d_n=1$ are illustrated in FIG. 4B.

Since, in contrast to the conventional procedure, the demodulation is not carried out on the basis of a comparison of the sample symbol with a predetermined modulation alphabet, but on the basis of determining the relative phase angle between the sample symbol and a previously estimated (not predetermined) modulation state, it is always possible to make a decision with regard to distinguishing between the cases in equation (8)—that is to say demodulation of the CPFSK signal.

Since the estimated modulation state $\hat{a}_{n-1}$ for demodulating the CPFSK signal is used in the time step n, the inventive method is referred to, in an obvious manner, as a transmitter state tracking method.

Figure 5:
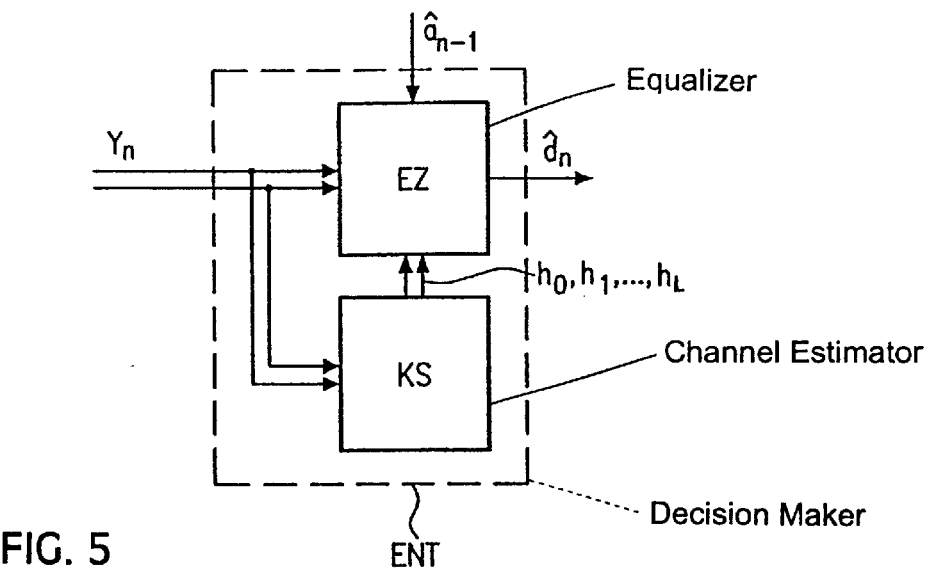
FIG. 5 is a block diagram of an adaptive equalizer based on one variant of the exemplary embodiment shown in FIG. 3B.

Assuming that the transmission channel varies with time, is subject to distortion, and is subject to disturbances (for example a mobile radio channel), the decision maker ENT may also be in the form of an adaptive equalizer. FIG. 5 shows an appropriate design for the decision maker ENT.

In this case, the decision maker ENT has a channel estimator KS and an equalizer EZ. Both the equalizer EZ and the channel estimator KS are supplied with the complex-value sample symbols $y_n$.

In principle, any desired equalizer EZ may be used. The inventive principle will be explained in the following text using the example of a Viterbi equalizer.

The channel memory of the equivalent, time-discrete model channel on which the Viterbi equalization is based is, as already mentioned, denoted by L. The channel estimator KS continues to repeatedly determine a total of L+1 estimated channel impulse responses $h_l$, $l=0, 1, \ldots, L$. The Viterbi equalizer EZ determines the data symbol sequence $\{\hat{d}_n\}$ from the sequence of the sample values $\{y_n\}$, from the L+1 estimated channel impulse responses $h_l$, and from the estimated values produced by the substitute symbol estimation device ESE.

The sample values $y_n$ can be expressed using $$y_n = \sum_{l=0}^{L} a_{n-l} h_l + n_n \quad (10)$$

as time-discrete convolutions of the transmitted substitute symbol sequence $\{a_n\}$ with the L+1 channel impulse responses $h_0, h_1, \ldots, h_L$ plus a disturbance symbol sequence $\{n_n\}$ which represents the additive disturbance n(t) and consists of disturbance symbols $n_n$.

The conventional method of operation of a Viterbi equalizer for CPFSK demodulation will be summarized briefly, first of all:

Viterbi equalizers are MLSE (Maximum Likelihood Sequence Estimation) sequence estimators. A substitute symbol sequence $\{a_n\}$ that will be estimated and that consists of p+1 elements (where p is a positive integer) will be considered. Based on the MLSE, a supposedly transmitted sequence is defined as that $\{\hat{a}_n\}$ of the possible p+1 element substitute symbol sequences $h_0, h_1, \ldots, h_L$ whose symbols, weighted with the estimated channel impulse responses $\hat{h}_0, \hat{h}_1, \ldots, \hat{h}_L$, are at the shortest Euclidean distance from the sequence of measured sample values $y_n$. The condition for the p+1 element substitute symbol sequence $\{\hat{a}_n\}$ that is sought is as follows:

$$\sum_{n=0}^{L+p} \left( y_n - \sum_{l=0}^{L} a_{n-l} \hat{h}_l \right)^2 = \text{Minimum for } \{\hat{a}_n\} = \{a_n\} \quad (11)$$

The condition equation (11) is solved recursively using the Viterbi algorithm (VA).

For this purpose, the discrete-time model channel is described as a finite, clocked automatic device. The state $A_n$ (which is not known in the receiver) of the channel with respect to the time step n in the conventional VA demodulation process for a CPFSK signal is described uniquely by the statement of the L substitute symbols $a_{n-L}, \ldots, a_{n-2}, a_{n-1}$ entered most recently at the transmitter and by an accumulated phase $$\phi_{n-L-1} = \pi\eta \sum_{l=-\infty}^{n-L-1} d_l,$$

that is to say by the L+1 tuple:

$$A_n = (\phi_{n-L-1}; a_{n-L}, \ldots, a_{n-2}, a_{n-1}).$$

This actual channel state $A_n$ is, of course, not known in the receiver.

In general, a channel state can be stated by using an L+1 tuple $Z_n = (\phi_{n-L-1}; z_n^{L-1}, \ldots, z_n^{1}, z_n^{0})$. Each of the variables $z_n^{L-1}, \ldots, z_n^{1}, z_n^{0}$ may assume the values of the modulation alphabet (that is to say, in the prior art, the substitute symbols).

Figure 6:
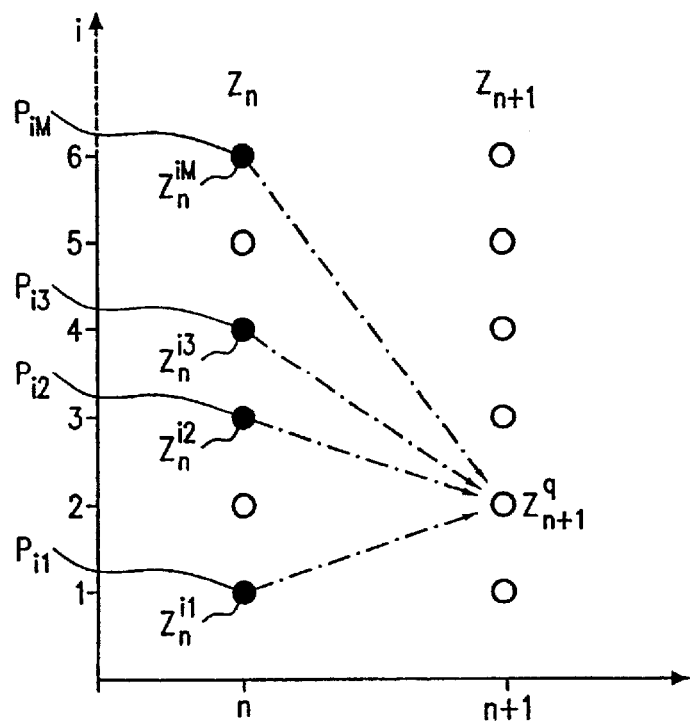
FIG. 6 is a portion of a trellis diagram for explaining Viterbi equalization.

The transmitted sequence $\{a_n\}$ defines a path through the possible channel states, $Z_n$, which are plotted over the time steps n on a graph. This graph is called a trellis diagram (or simply a trellis). In order to estimate the transmitted sequence $\{a_n\}$, the VA determines the sequence $\{A_n\}$ of states through the trellis diagram. The path through the trellis diagram identified by the sequence $\{A_n\}$ is also referred to as the "shortest" path through the trellis diagram. FIG. 6 uses an example of a M-stage data signal and a rational modulation index (in a corresponding way to FIG. 4A, M=4 was chosen for this illustration) to show a detail of the trellis diagram for the two time steps n and n+1. Each circle represents one possible channel state. The possible channel states with respect to the time step n are denoted by $Z_n^1, Z_n^2, \ldots$, in general $Z_n^i$. A corresponding notation is used for the possible channel states relating to the time step n+1.

Each state relating to the time step n+1 can be reached by M transitions starting from M different predecessor states relating to the time step n. The M possible predecessor states relating to the time step n which lead to a specific state $Z_{n+1}^q$ which is identified by the index q, with respect to the time step n+1, will now be considered. For each of these M possible predecessor states $Z_n^{i1}, Z_n^{i2}, \ldots, Z_n^{iM}$ relating to the time step n, which are represented by bold lines in FIG. 6 (that is to say i1=1, i2=3, i3=4 and iM=i4=6 in FIG. 6), the shortest path $P_{i1}, P_{i2}, P_{i3}$ and $P_{iM}$ leading to this state has already been determined in the previous recursion. The question is, which of these M paths that lead to the possible predecessor states $Z_n^{i1}, Z_n^{i2}, \ldots, Z_{niM}$ is the path, which if it is continued to the state $Z_{n+1}^q$ under consideration in the time step n+1, forms the shortest path to this state $Z_{n+1}^q$.

In order to answer this question, a metric increment $I(Z_n^{i1}, y_n), I(Z_n^{i2}, y_n), \ldots, I(Z_n^{iM}, y_n)$ is calculated in the VA for each of the transitions under consideration (between one of the possible predecessor states $Z_n^{i1}, Z_n^{i2}, \ldots, Z_n^{iM}$ and the destination state $Z_{n+1}^q$ under consideration), to be precise using:

$$I(Z_n^i, y_n) = \left(y_n - \sum_{l=1}^{L} z_n^{1-l,(i)} \hat{h}_l - a_n \hat{h}_0\right)^2 \quad (12)$$

i=i1, i2, ..., 1M,
where, in accordance with the notation which has already been introduced, the M predecessor states are each described by an L+1 tuple $Z_n^i = (\phi_{n-L-1}^{(i)}; z_n^{L-1,(i)}, \ldots, z_n^{1,(i)}, z_n^{0,(i)})$, i=i1, i2, ..., iM.

A minimal metric $Me(Z_n^{i1}), Me(Z_n^{i2}), \ldots, Me(Z_n^{iM})$ has already been calculated with respect to the time step n for each of the M possible predecessor states $Z_n^{i1}, Z_n^{i2}, \ldots, Z_n^{iM}$ on the basis of the recursive calculation. The path decision process for the time step n is carried out on the basis of these known M minimal metrics $Me(Z_n^{i1}), Me(Z_n^{i2}), \ldots, Me(Z_n^{iM})$ for the possible predecessor states, and on the basis of the calculated M metric increments $I(Z_n^i, y_n)$ for the respective transitions. This includes the following three steps:

an addition step ("ADD") is used to calculate the M candidates, which are denoted $me^i(Z_{n+1}^q)$, for the minimal metric of the destination state $Z_{n+1}^q$ under consideration as the sum of the respective minimal metric of one of the predecessor states and of the associated metric increment, using:

$$me^i(Z_{n+1}^q) = Me(Z_n^i) + I(Z_n^i, y_n), \; i=i1, i2, \ldots, iM \quad (13)$$

a comparison step ("COMPARE") is used to determine which of the M calculated metrics $me^i(Z_{n+1}^q)$ has the smallest value. This becomes the minimal metric $Me(Z_{n+1}^q)$ for the state under consideration.

a selection step ("SELECT") is used to select which predecessor state of the M possibile predecessor states $Z_n^{i1}, Z_n^{i2}, \ldots, Z_n^{iM}$ is the point of origin for the transition to the state $Z_{n+1}^q$ with the minimal metric $Me(Z_{n+1}^q)$, that is to say the index i for which $me^i(Z_{n+1}^q) = Me(Z_{n+1}^q)$ is determined. This results in the correct predecessor state. The paths which lead to the other predecessor states now no longer need be followed any further.

These three steps are referred to as ACS (Add-Compare-Select) operations. The estimated input data symbol $\hat{d}_n$ is then calculated using the accumulated phase with respect to the path that has been found.

This known use of the VA for demodulating a CPFSK signal is modified in the invention. This is because a non-rational modulation index would result in an infinitely large number of states, so that it would not be possible to produce or implement the trellis.

Since, according to the invention, the input data symbol $d_n$ relating to the time step n is estimated directly, rather than estimating the transmitted substitute symbol $a_n$, it is possible to configure a trellis in which, first, the accumulated phase is no longer included in the states and in which, second, only a finite number of states occur even when the modulation index $\eta$ is not rational. The states are assigned such that only the last L input data symbols on the basis of the present ISI are considered. In addition, the i-th state of the trellis relating to the time step n is described in general form by the L-tuple: $Z_n^i = (z_n^{L-1,(i)}, \ldots, z_n^{1,(i)}, z_n^{0,(i)})$, in which case the variables $z_n^{L-1,(i)}, \ldots, z_n^{1,(i)}, z_n^{0,(i)}$ can assume the possible values of the input data symbols $d_n$, that is to say $\{1, -1\}$.

The actual channel state, which is not known in the receiver, relating to the time step n is then described by the L tuple $D_n = (d_{n-L}, \ldots, d_{n-2}, d_{n-1})$.

The example where L=2 is considered in the following text. The undisturbed, reconstructed signal denoted by $\hat{r}_n^{(i)}$ and relating to the time step n in the state i is determined, using equation (11), resulting in:

$$\hat{r}_n^{(i)} = \sum_{l=0}^{L} a_{n-l}^{(i)} \hat{h}_l \stackrel{L=2}{=} a_n^{(i)} \hat{h}_0 + a_{n-1}^{(i)} \hat{h}_l + a_{n-2}^{(i)} \hat{h}_2 \quad (14)$$

$$= a_{n-1}^{(i)} e^{j\pi\eta d_n} \hat{h}_0 + a_{n-1}^{(i)} \hat{h}_1 + a_{n-1}^{(i)} e^{j\pi\eta(-d_{n-1})} \hat{h}_2$$

The undisturbed, reconstructed signal is now used on the basis of equation (12) together with the (disturbed) received signal $y_n$ in order to calculate a transition metric:

$$I(Z_n^i, y_n) = (y_n - \hat{r}_n^{(i)})^2 \quad (15)$$

When calculating the transition metric, the estimated, tracked transmitter state $\hat{a}_{n-1}^{(i)}$ is used for $a_{n-1}^{(i)}$. The estimation process can once again be carried out using equation (9) on the basis of the demodulation result obtained in the preceding demodulation step, that is to say:

$$\hat{a}_{n-1}^{(i)} = \hat{a}_{n-2}^{(i)} \exp\{j\pi\eta \hat{d}_{n-1}\} \quad (16)$$

The ACS operations relating to the transitions under consideration can then be carried out in the manner already described.

Equation (14) illustrates that, when using the VA according to the invention for demodulating a CPFSK signal with L=2, there is no need to take account of the accumulated phase, but only of one state $d_n, d_{n-1}$, which includes two input data symbols.

In addition to the two applications explained above (coherent reception without equalization and with VA equalization), the inventive principle can also be applied to other equalizers, for example equalizers with quantized feedback, so-called DF (Decision Feedback) equalizers.

We claim:

1. A method for demodulating a CPFSK-modulated signal, which comprises:

obtaining an estimate $\hat{a}_{n-2}$ of an n−1-th substitute symbol $a_{n-1}$, which occurs in a linear approximation of the CPFSK modulated signal, as a function of a previously determined n−1-th input data symbol $\hat{d}_{n-1}$; and determining an n-th input data symbol $\hat{d}_n$ on which the CPFSK modulated signal is based by using the estimate $\hat{a}_{n-1}$ of the n−1-th substitute symbol $a_{n-1}$ occurring in the linear approximation of the CPFSK modulated signal to compare a phase angle of a currently obtained n-th complex-value sample symbol $y_n$ relative to a phase angle of the estimate $\hat{a}_{n-1}$ of the n−1-th substitute symbol $a_{n-1}$ that has been estimated for an n−1-th time step.

2. The method according to claim 1, wherein the step of obtaining the estimate of the n−1-th substitute symbol includes using an equation $\hat{a}_{n-1}=\hat{a}_{n-2} \exp\{j\pi\eta \hat{d}_{n-1}\}$, where $\hat{a}_{n-1}$ is the estimate for the n−1-th substitute symbol, $\hat{a}_{n-2}$ is an estimate for an n−2-th substitute symbol, $\hat{d}_{n-1}$ is the n−1-th input data symbol that has been determined, and η denotes a modulation index.

3. The method according to claim 1, wherein the step of determining the n-th input data symbol $d_n$ includes obtaining a determined value of the n-th input data symbol $d_n$ using an equation:

$$\hat{d}_n = \begin{cases} 1 & \arg(y_n) > \arg(\hat{a}_{n-1}) \\ -1 & \arg(y_n) < \arg(\hat{a}_{n-1}) \end{cases} ;$$

where $\hat{d}_n$ is the determined value of the n-th input data symbol $d_n$.

4. The method according to claim 1, which comprises using a Viterbi equalizer for performing the step of determining the n-th input data symbol $d_n$.

5. The method according to claim 1, which comprises obtaining an equalization by using an equalizer for performing the step of determining the n-th input data symbol $d_n$.

6. The method as claimed in claim 5, wherein:

the step of obtaining the equalization includes basing the equalization on a trellis state diagram, in which an i-th channel state relating to a time step n is described by and L-tuple $z_n^i=(z_n^{L-1,(i)}, \ldots, z_n^{1,(i)}, z_n^{0,(i)})$;

$z_n^{L-1,(i)}, \ldots, z_n^{1,(i)}, z_n^{0,(i)}$ can each assume possible values of input data symbols $d_n$; and L denotes a channel memory.

7. A devise for demodulating a CPFSK-modulated signal, comprising:

an input data symbol decision device for determining an n-th input data symbol $\hat{d}_n$ on which the CPFSK-modulated signal is based; and a substitute symbol estimation device for estimating an n−1-th substitute symbol $\hat{a}_{n-1}$ occurring in a linear approximation of the CPFSK-modulated signal as a function of a previously determined n−1-th input data symbol $\hat{d}_{n-1}$ said substitute symbol estimation device being constructed for estimating the n−1-th substitute symbol $\hat{a}_{n-1}$ using an equation:

$$\hat{a}_{n-1}=\hat{a}_{n-2} \exp\{j\pi\eta \hat{d}_{n-1}\}$$

where $\hat{a}_{n-2}$ is an estimate of an n−2-th substitute symbol and η denotes a modulation index;

said input data symbol decision device configured for using the n−1-th substitute symbol $\hat{a}_{n-1}$ that has been estimated for determining the n-th input data symbol $\hat{d}_n$.

8. The device according to claim 7, wherein said input data symbol decision device is constructed for determining the n-th input data symbol $d_n$ based on a phase angle of a currently obtained n-th complex-value sample symbol $y_n$ relative to a phase angle of the n−1-th substitute symbol $\hat{a}_{n-1}$ that has been estimated for an n−1-th time step.

9. The device according to claim 7, wherein said input data symbol estimation device is an equalizer.

10. The device according to claim 7, wherein said input data symbol estimation device is a Viterbi equalizer.

* * * * *

UNITED STATES PATENT AND TRADEMARK OFFICE
CERTIFICATE OF CORRECTION

PATENT NO. : 6,785,348 B2
DATED : August 31, 2004
INVENTOR(S) : Markus Hammes et al.

It is certified that error appears in the above-identified patent and that said Letters Patent is hereby corrected as shown below:

Column 11,
Line 14, should read -- signal by comparing a phase angle of a currently obtained --.

Signed and Sealed this

Eleventh Day of April, 2006

JON W. DUDAS
*Director of the United States Patent and Trademark Office*